INVENTOR
Yutaka Koizumi

3,606,535
DEVICE FOR RECTIFYING UNEVEN DISTRIBUTION OF ILLUMINATION INTENSITY IN A SLIT EXPOSURE MECHANISM

Yutaka Koizumi, Tokyo, Japan, assignor to Kabushiki Kaisha Ricoh, Tokyo, Japan
Filed Feb. 14, 1969, Ser. No. 799,435
Claims priority, application Japan, Feb. 17, 1968, 43/11,519
Int. Cl. G03b 27/70
U.S. Cl. 355—66                                          1 Claim

ABSTRACT OF THE DISCLOSURE

A slit exposure photo-copying device having an optical system with two reflecting mirrors joined at a right angle for projecting an image along a path parallel to the parallel planes of the document to be copied and the photosensitive surface. A contoured shield plate is inserted into the system at the joint of the mirrors in order to rectify the uneven distribution of illumination intensity of light reflected from the document to the photosensitive surface.

DETAILED DESCRIPTION OF INVENTION

The present invention relates to a device for rectifying uneven distribution of illumination intensity in a slit exposure mechanism and has for its object to rectify uneven distribution of illumination intensity upon a photosensitive surface from an illumination lamp without the necessity of any complicated modification of the illumination lamp, the reflector thereof or the like.

Figure 1:
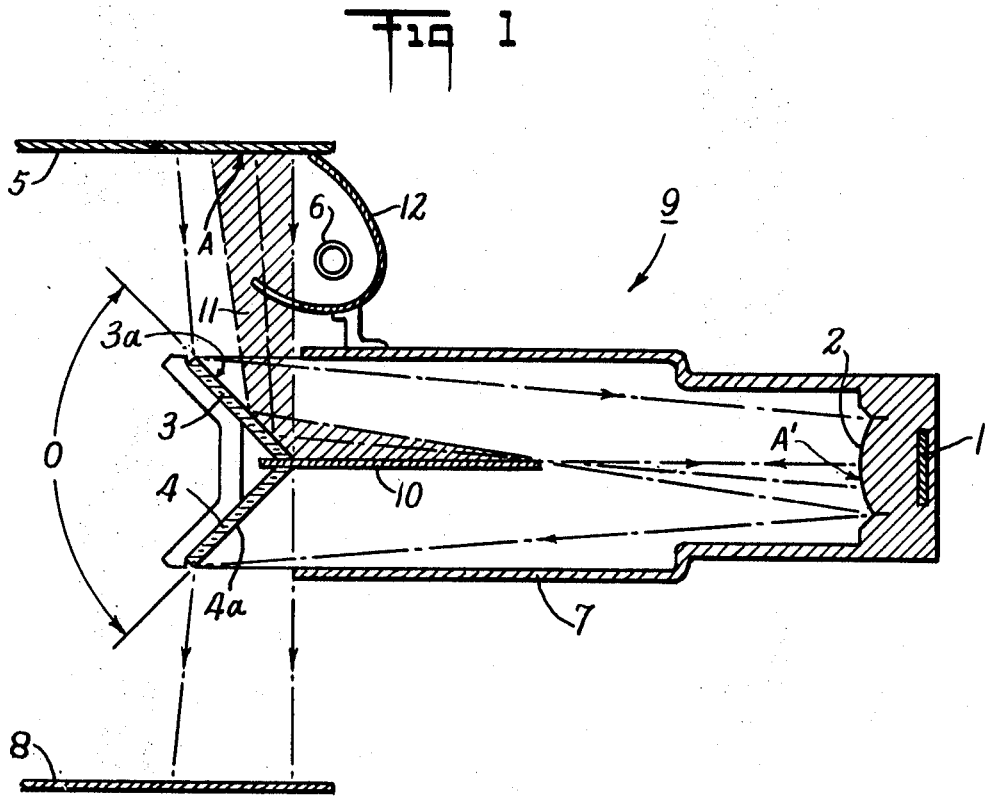
FIG. 1 is a sectional view of a slit exposure mechanism to which is applied the present invention.

The device of the present invention is best suited for application to a slit exposure mechanism generally designated by 9 in FIG. 1. The mechanism 9 includes as shown in FIG. 1 a photocopying lens 2 having a reflecting mirror 1 disposed backwardly thereof; a pair of rectangular reflecting mirrors 3 and 4, one side edges of the reflecting planes or surfaces 3a and 4a of these mirrors being abutted against each other at substantially 90° in a plane containing the optical axis of the photocopying lens 2; and a tubular lamp 6 for illuminating an original 5 held stationarily. A box-shaped moving body 7 movably carried upon the main body of the machine is caused to move between the original 5 and a photocopying paper 8 placed in parallel with the original 5, thereby effecting a slit exposure.

The lights from the lamp 6 are reflected by the original 5, further reflected by the reflecting surface 3a of the reflecting mirror 3 and made incident upon the photocopying lens 2. The lights are further reflected by the reflecting mirror 1, emerges out of the photocopying lens 2, and are reflected by the reflecting surface 4a of the reflecting mirror 4, thus directing toward the copying paper 8. A shield plate 10 extends from the joint between the reflecting mirrors 3 and 4 in order to prevent the lights from the illumination lamp 6 from being directly incident upon the copying paper without passing through the photocopying lens 2. This shield plate 10 extends in a plane containing the optical axis of the photocopying lens 2 from the joint between the mirrors 3 and 4 toward the photocopying lens 2.

The shield plate 10 disposed in a plane which divides or bisects the photocopying lens 2 serves not only to prevent the illumination lights from being incident randomly upon the photoconductive layer of the copying paper but also to control the light rays effective for exposure incident upon the photocopying lens. The range of light rays thus controlled is determined by a length of the shield plate. For example, the light rays indicated by a hatched portion 11 in FIG. 1 cannot be made incident upon the whole surface of the photocopying lens 2. That is, the light rays reflected from an area of the original 5 located on the right side from the point A will not be incident upon the area of the photocopying lens 2 below the point A' so that the lights reaching the copying paper will be reduced accordingly.

As described above since the shield plate 10 serves to control the light rays incident upon the copying paper, uneven distribution of light intensity upon the copying paper, that is uneven distribuiton of light intensity due to the performances or characteristics of the illumination lamp and the photocopying lens can be rectified by suitably determining the configuration of the leading side edge of the shield plate 10.

Figure 2:
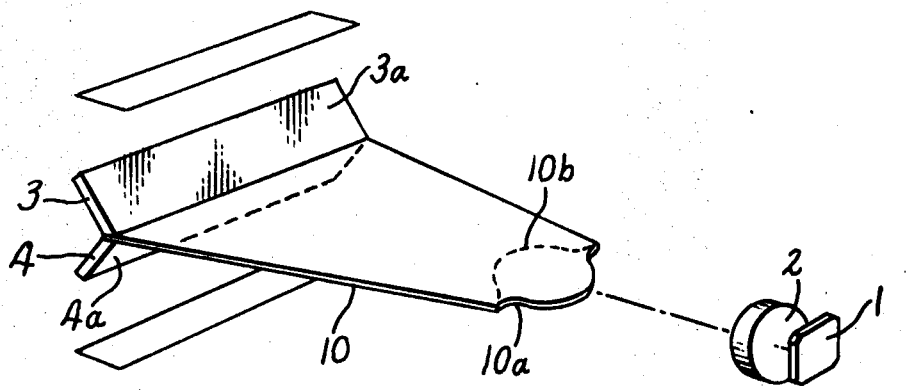
FIG. 2 is a perspective view of one preferred embodiment of a device for rectifying uneven distribution of illumination intensity according to the present invention.

In FIG. 2, there is shown one embodiment of the shield plate 10 of the present invention having the center portion of the leading side edge 10a extended toward the photocopying lens 2. Furthermore, a portion of the shield plate 10 adjacent to the leading side edge 10a thereof is recessed as shown by 10b in order to more effectively rectify uneven distribution of light intensity upon the copying paper. It is desired to determine configurations of the leading side edge 10a of the shield plate 10 experimentarily and empirically in consideration of the design factors such as performance of illumination lamps, illumination lamp reflectors 12 which are mass-produced and have predetermined configurations and any other factors which would cause uneven distribution of light intensity.

According to the prior art, in order to rectify uneven distribution of light intensity, illumination lamps themselves or their reflectors serving to compensate uneven distribution of light intensity have been modified, for example, by changing their configurations, but satisfactory results have not been attained. However, according to the present invention in which the leading side edge portion of the shield plate which directly intercepts the light rays has a non-linear configuration in order to control or limit the light rays partially, rectification of uneven distribution of light intensity can be attained satisfactorily in a simple manner.

I claim:

1. A device for rectifying uneven distribution of light intensity in a slit exposure mechanism which has an optical system including:

a photocopying lens having a reflecting mirror disposed backwardly thereof;

a pair of reflecting mirrors whose one sides are abutted against each other in a plane containing the optical axis of said photocopying lens in such a manner that the reflecting surfaces of said pair of reflecting mirrors form an angle of substantially 90°; and an illumination lamp for illuminating the surface of an original;

said original and a copying paper spaced apart from and is opposite to and parallel with said original being displaced relative to said optical system thereby effecting the slit exposure, characterized in that a shield plate extends from said joint of said pair of reflecting mirrors toward said photocopying lens and has the leading side edge formed in non-linear configuration.

References Cited

UNITED STATES PATENTS

| | | | |
|---|---|---|---|
| 3,088,386 | 4/1963 | Sugarman | 355—11 |
| 3,364,816 | 1/1968 | Jeffree | 355—51 |
| 3,451,752 | 6/1969 | Frank | 355—66 |
| 3,469,916 | 9/1969 | Sloan | 355—67 |

JOHN M. HORAN, Primary Examiner

D. J. CLEMENT, Assistant Examiner

U.S. Cl. X.R.

355—67, 51